(12) United States Patent
Rossi et al.

(10) Patent No.: US 6,443,697 B1
(45) Date of Patent: Sep. 3, 2002

(54) TURBINE WHEEL AND PELTON TURBINE EQUIPPED WITH SAME

(75) Inventors: Georges Rossi, Saint Ismier; Louis Finet, Vif; Jean-Marie Roman, Echirolles, all of (FR)

(73) Assignee: ALSTOM Power Hydro, Grenoble (FR)

( * ) Notice: Subject to any disclaimer, the term of this patent is extended or adjusted under 35 U.S.C. 154(b) by 0 days.

(21) Appl. No.: 09/646,285
(22) PCT Filed: Mar. 22, 1999
(86) PCT No.: PCT/FR99/00670
§ 371 (c)(1),
(2), (4) Date: Sep. 15, 2000
(87) PCT Pub. No.: WO99/49213
PCT Pub. Date: Sep. 30, 1999

(30) Foreign Application Priority Data

Mar. 23, 1998 (FR) .............................................. 98 03780

(51) Int. Cl.⁷ ................................ F01D 1/02; F03B 1/04
(52) U.S. Cl. ..................................................... 415/202
(58) Field of Search ...................... 415/202; 416/197 B, 416/197 A, 214 R, 214 A, 190, 192

(56) References Cited

U.S. PATENT DOCUMENTS 4,950,130 A * 8/1990 Erlach ........................ 415/202

FOREIGN PATENT DOCUMENTS

FR 570 124 A * 4/1924
GB 688 577 A * 3/1953

* cited by examiner

*Primary Examiner*—F. Daniel Lopez
*Assistant Examiner*—Kimya N McCoy
(74) *Attorney, Agent, or Firm*—Dowell & Dowell, P.C.

(57) ABSTRACT

The invention concerns a Pelton turbine wheel comprising a rim (1) and several buckets (2) distributed at the rim periphery, characterised in that it comprises at least a ring-shaped flange (5, 6) integral with the rim and provided with housings (7) for receiving the buckets. The flange is capable of absorbing at least part of the efforts transmitted by the buckets (2) to the rim (1) and forms a peripheral strip (9) at external radial zones of the housings (7). The transmission of the efforts from the buckets (2) to the wheel rim (2) is carried out without generating too considerable a concentration zone of mechanical stresses.

10 Claims, 3 Drawing Sheets

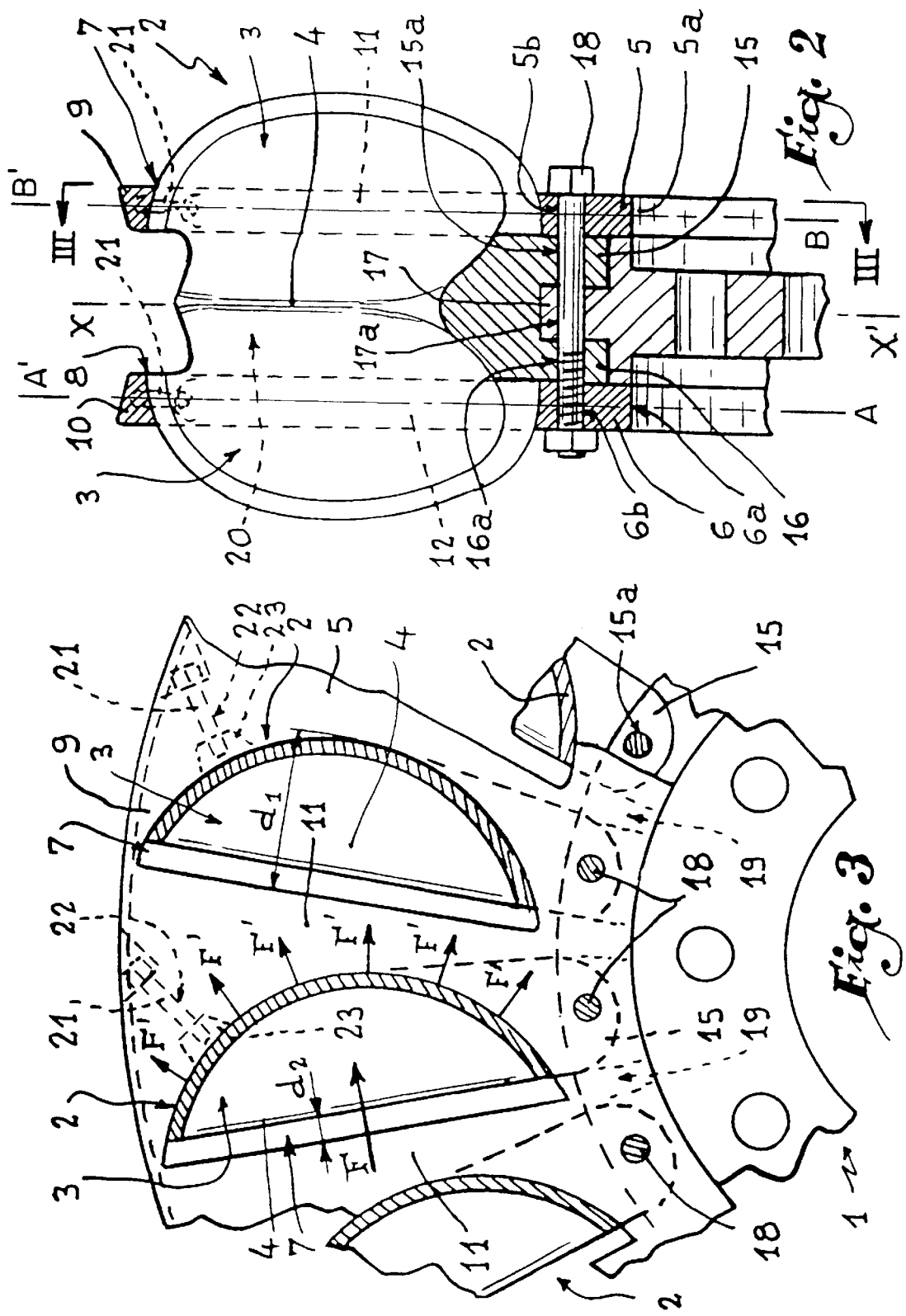

TURBINE WHEEL AND PELTON TURBINE EQUIPPED WITH SAME

BACKGROUND OF THE INVENTION

1. Field of the Invention

The present invention relates to a turbine wheel and to a Pelton-type turbine equipped with such a wheel.

2. Brief Description of the Related Art

Pelton turbines are conventionally used for transforming the kinetic energy of a fluid, such as the water of a waterfall, into mechanical energy. Such transformation is effected by rotating the turbine wheel under the effect of a tangential effort exerted, on buckets disposed on the periphery of a wheel rim, by a jet of water emerging from one or more injector nozzles distributed around the wheel.

The effort created on each bucket is transmitted to the wheel rim through an area of attachment of the bucket on the wheel rim. This area of attachment, defined by the geometrical intersection of the bucket with the rim, is subjected to considerable mechanical stresses. In effect, each bucket may be mechanically modelized as a beam fixed on one side only, with the result that it undergoes a considerable bending strain due to the effort of the jet. In addition, high vibratory stresses are applied to the bucket and there is a danger of resonance of the bucket or the rim.

In known devices, particularly of EP-A-0 346 681 or of EP-A-0 522 336, attempts have been made to overcome these drawbacks by reinforcing the area of attachment of the buckets on the wheel rim. This leads to structures which are complicated and therefore expensive, and of reduced reliability. In addition, each bucket remains attached to the rim by one side, with the result that the nature of the problems encountered is not fundamentally changed.

FR-A-704 875 teaches making the buckets of a turbine abut on one another by means of rings mounted on their periphery. The distribution of the efforts is not optimum and arms must be interposed between adjacent buckets, being mounted with the greatest care, which results in a non-homogeneous distribution of the efforts.

SUMMARY OF THE INVENTION

It is a particular object of the present invention to overcome these problems by proposing a turbine wheel of Pelton type in which the buckets are connected to the wheel rim so that the mechanical stresses are not concentrated in an area of attachment of the bucket to the rim and the dangers of resonance of the wheel are substantially reduced thanks to an optimized distribution of efforts.

In that spirit, the invention relates to a wheel of the above type, which comprises at least one annular disk fast with the wheel rim and provided with housings for receiving the buckets. This disk is adapted to absorb at least part of the efforts transmitted by the buckets to the rim and forms a peripheral band at the level of the outer radial areas of the housings.

Thanks to the invention, the disk which is on one piece and surrounds the buckets, makes it possible to support them, near the rim, in an intermediate area and in an outer radial area, with the result that each bucket is maintained efficiently in its inner, outer and central radial areas and that the effort to which it is subjected, due to the existence of the jet of fluid driving the turbine, has for its effect to apply it on the disk. This effort is in that case not concentrated solely in one area of attachment of the bucket to the wheel rim, but distributed over the whole of the disk. In other words, the tangential effort created on a bucket is transmitted to the disk. The bucket and that part of the disk supporting the bucket may be mechanically modelized as a beam on two bearings, and even a beam bearing on its length, the first bearing being towards the wheel rim, while the second bearing is constituted by the peripheral band of the disk. Such a distribution of the efforts induces a reduction of the stresses exerted on the mechanical components, which makes it possible to envisage pieces of lesser thickness.

Taking the foregoing into account, a turbine wheel according to the invention may be made of metal, composite material or be a mixed structure. For example, certain pieces, such as the wheel rim or the disk, are made of metal, while other pieces, such as the buckets, are made of composite synthetic material. A wheel rim or a disk made of composite plastics material may also be associated with metal buckets.

In addition, the presence of the outer peripheral band of the disk, which creates a continuity of matter outside the wheel, makes it possible substantially to reduce the vibratory stresses exerted on the buckets. In effect, the peripheral band contributes to distributing these stresses on the different buckets, with the result that the equivalent inherent mode of each bucket is no longer that of a beam fitted at one end only, as in the devices of of the prior art, but that of a beam fitted on one side and bearing on or fitted on the other side.

Finally, it has been surprizingly found that the presence of the disk makes it possible very substantially to improve the aerodynamic performances of the wheel of the invention. In effect, the disk makes it possible to limit the so-called "ventilator" effect of the wheel during rotation, i.e. the recirculation of the air between the outside of the wheel and the spaces between two consecutive buckets, due to the movement of rotation. Such reduction of the transverse air movements with respect to the buckets was able to be quantified, by laboratory tests, at about 20% of the braking force due to the ventilation of the wheel in the absence of disk. In this way, the invention also enables the yield of a Pelton turbine wheel to be substantially improved.

According to a first advantageous aspect of the invention, the wheel comprises two disks disposed on either side of one or more injector nozzles of the turbine. This aspect of the invention makes it possible to dispose the disks opposite each bowl or scoop of the buckets when the buckets are double, as is conventionally the case in Pelton turbines. In that case, the disks may be provided to be substantially aligned on the median axes of the scoops of the buckets.

According to another advantageous aspect of the invention, the disk or disks is/are provided with spokes each adapted to substantially fill the space separating two adjacent buckets of the wheel. Thanks to this aspect of the invention, the spokes present a sufficient cross-section to absorb the mechanical stresses transmitted by the buckets. Moreover, the fact that they substantially fill the space separating two buckets makes it possible to optimize the reduction of the "ventilator" effect.

According to a first embodiment of the invention, the disk or disks is/are in the form of a perforated ring, means for removably mounting the or each disk on the wheel rim being provided near an inner edge of the or each disk.

According to a second embodiment of the invention, the disk or disks is/are formed in one piece with at least part of the wheel rim. Thanks to this aspect of the invention, transfer of the efforts of the disk towards the wheel rim is optimized. In addition, assembly of the turbine wheel may be facilitated. In that case, the wheel rim may be provided to be formed by two half-rims, each half-rim extending radially towards the outside by a disk.

According to another advantageous aspect of the invention, applicable whatever the embodiment, the buckets are removably fixed on the disk or disks and/or the wheel rim. This aspect of the invention guarantees a good dimensional stability of the wheel during use and an efficient transfer of the efforts from the buckets towards the wheel rim. In addition, the operations of maintenance on the buckets or the disks are facilitated.

According to another aspect, the bucket may be permanently fixed on the disk or disks and/or the wheel rim.

The invention also relates to a Pelton-type turbine comprising a wheel as described hereinbefore. Such a turbine may be manufactured more economically than the prior art ones since it is possible to optimize the dimensioning of the pieces by taking into account the fact that the mechanical stresses are better distributed over the wheel. In addition, the yield of this turbine is improved by reduction of the ventilator effect.

The invention will be more readily understood and other advantages thereof will appear more clearly from the following description of two embodiments of a turbine wheel in accordance with its principle, given solely by way of example and made with reference to the accompanying drawings, in which:

BRIEF DESCRIPTION OF THE DRAWINGS

FIG. 2 is a section along line II—II of FIG. 1.

FIG. 3 is a section along line III—III of FIG. 2, and

DESCRIPTION OF THE PREFERRED EMBODIMENT

Figure 1:
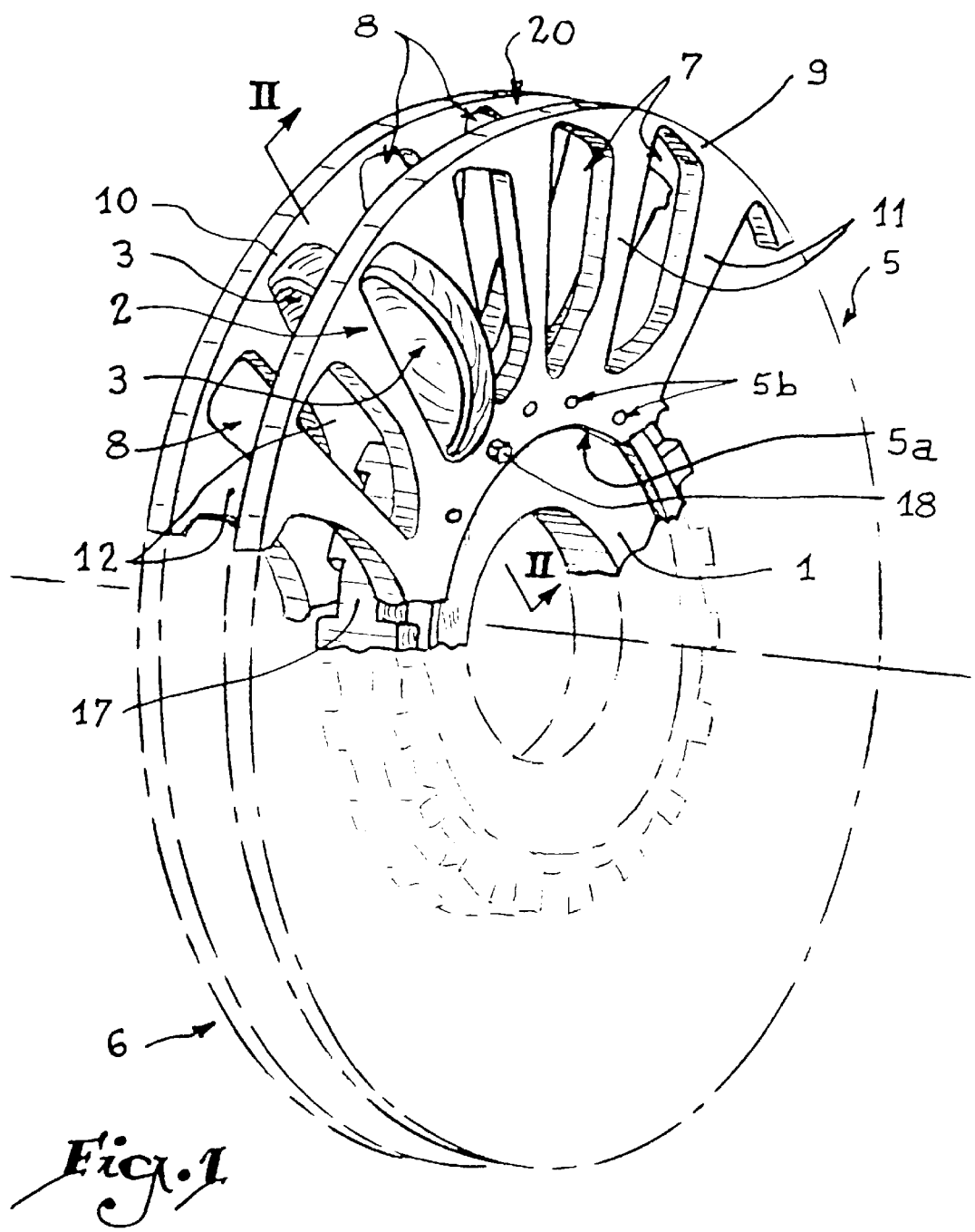
FIG. 1 is a partial perspective view of a Pelton turbine wheel according to the invention.

Referring now to the drawings, the turbine wheel shown in FIG. 1 comprises a wheel rim 1 and buckets 2, eighteen in number in the example shown, distributed on the periphery of the rim 1. Each bucket comprises two scoops 3 separated by a central edge 4 intended to be disposed opposite one or more water or steam injector nozzles (not shown). The rim 1 is provided to be mounted on a movement transfer shaft (likewise not shown).

In order to render the drawing clearer, only one bucket has been shown in FIG. 1.

In accordance with the invention, two disks 5 and 6 in annular form are mounted on the rim 1 and contribute to maintaining the buckets 2 with respect to this rim. The disks 5 and 6 are respectively provided with housings 7 and 8 in which the scoops 3 of the buckets 2 are respectively inserted. The housings 7 and 8 may be machined or obtained by moulding in the disks 5 and 6. Each of the disks 5 and 6 passes radially and outwardly of the buckets 2, with the result that two continuous bands 9 and 10 are respectively defined in the outer peripheral areas of the disks 5 and 6. These continuous bands 9 and 10 connect spokes 11 and 12 respectively belonging to disks 5 and 6. Each housing 7 of the disk 5 is defined by two adjacent spokes 11 forming part of the disk 5 and by the band 9, while each housing 8 of disk 6 is defined by two adjacent spokes 12 forming part of the disk 6 and by the band 10.

In this way, each bucket 2 is supported both by the wheel rim 1 and by the two disks 5 and 6 which each form a one-piece annular ring around the rim 1, with the result that the efforts of thrust F, visible in FIG. 3 and transmitted to a bucket 2 by the jet of water or steam, are distributed in efforts F' in the spokes 11 or 12 of the disks 5 or 6 from which they are transmitted to the rim 1. Part of these efforts may also transit via the area of attachment of the buckets on the rim as in the known devices. Thanks to this distribution, the area of attachment of the buckets 2 on the wheel rim 1 is not a critical mechanical stress area.

Assembly of the buckets and the disks on the wheel rim 1 is more clearly apparent in FIGS. 2 and 3. XX' is the axis of the central edge 4 of a bucket 2. The bucket 2 comprises two tabs 15 and 16 adapted to be disposed on either side of an outer radial part 17 of the rim 1. The elements 15 to 17 are respectively provided with a central bore 15a, 16a or 17a for receiving a locking screw 18. The disks 5 and 6 are provided to be disposed on either side of the rim 1 and of tabs 15 and 16 and comprise, near their respective inner edges 5a and 6a, bores 5b and 6b provided to be aligned with bores 15a, 16a and 17a, with the result that the screw 18 successively traverses the disk 5, the tab 15, the radial part 17, the tab 16 and the disk 6. In this way, disks 5 and 6 and bucket 2 are removably mounted on the wheel rim 1.

The efforts F due to the water or steam jet transmitted to the different buckets 2 do not transit solely via the tabs 15 and 16 of each bucket 2, but are distributed over the periphery of the rim 1, thanks to the disks 5 and 6 and, in particular, to bands 9 and 10.

In order to improve the rigidity of the assembly, and as is more particularly apparent in FIG. 3, area 17 of the rim 1 may be provided to be made by removing material with respect to the nominal width of the rim 1 which is conserved in the space 19 separating two continuous areas 17.

It will be understood that the geometry of the spokes 11 and 12 is adapted to the outer shape of the buckets, with the result that the latter are immobilized inside the housings 7 and 8 by cooperation of shapes, this presenting the additional advantage that the spokes 11 and 12 substantially fill the space separating two adjacent buckets of the wheel, with the result that the aerodynamic separation of the inner volume 20 defined between the two disks 5 and 6 with respect to the outside of these disks is optimized. In other words, the transverse circulation of air through the inner volume 20 is limited.

It will be noted that the disks 5 and 6 are substantially aligned on the median axes AA' and BB' of the scoops 3 of the buckets 2. This induces the spokes II and 12 of the disks 5 and 6 to be spaced apart from the bottom of the scoops 3 by a distance $d_1$ and from the edges of the scoops by a distance $d_2$, distances sufficient in order not to disturb the flow of water or steam towards the outside of the volume 20. The fact that distance $d_2$ is substantially smaller than distance $d_1$ corresponds to the fact that the spokes 11 and 12 substantially fill the space separating two adjacent buckets.

As is more clearly apparent in FIG. 3, each bucket 2 is also rendered fast with the disk 6 thanks to a locking screw 21 housed in a bore 22 in the disk 6 and adapted to engage in a rear boss 23 of the bucket 2. An identical construction is provided at the level of disk 5. The screw 21 improves the immobilization of the bucket 2 with respect to the disk 5.

Figure 4:
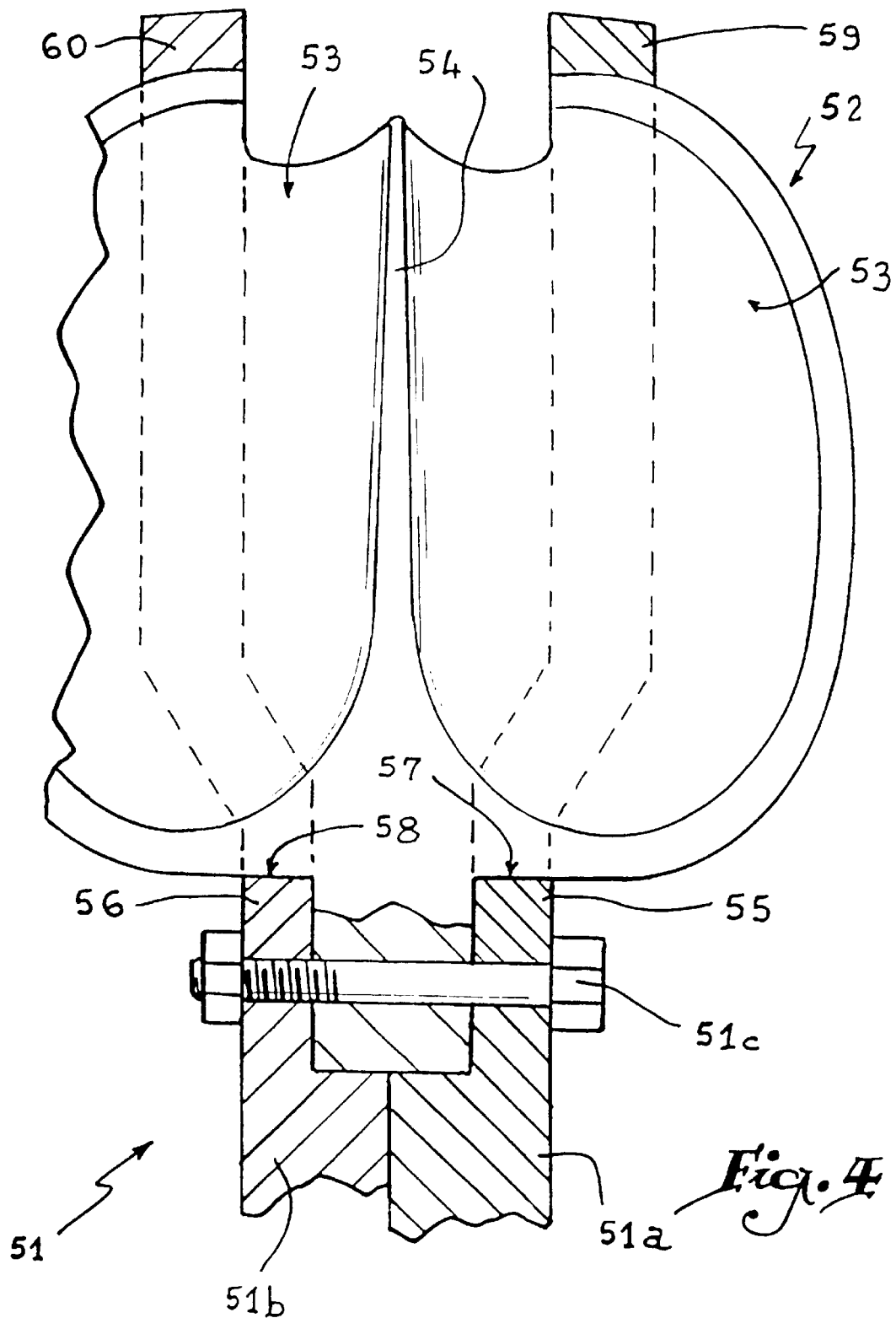
FIG. 4 is a view similar to FIG. 2 for a turbine wheel in accordance with a second embodiment of the invention.

In the second embodiment shown in FIG. 4, elements similar to those of the embodiment of FIGS. 1 to 3 bear identical references increased by 50. In this embodiment, the wheel rim 51 is formed by two half-rims 51a and 51b adapted to be assembled together, for example by means of screws 51c.

The half-rim 51a extends radially towards the outside by a one-piece ring 55 forming an annular disk whose function is identical to that of disk 5 of the previous embodiment. The ring or disk 55 extends radially to the outside of a bucket 52 provided with two scoops 53 separated by a central edge 54. Similarly, the half-rim 51b extends by a ring or annular disk 56 adapted to support the buckets 52. The rings 55 and 56 are provided with housings 57, 58 for receiving the buckets 52, while continuous bands 59 and 60, respectively belonging to disks 55 and 56, define housings 57 and 58 in their outer radial part.

As elements 51a and 55 on the one hand, 51b and 56 on the other hand, are formed in one piece, transmission of the efforts between disks 55 and 56 and the wheel rim 51 is optimal.

A Pelton turbine wheel according to this second embodiment is assembled by bringing the half-rims 51a and 51b towards each other, while buckets 52 are distributed radially in a position close to their final position, this making it possible to wedge a shank or tongue 52a of each bucket 52 between the half-rims 51a and 51b, thus improving the anchoring of the buckets 52 with respect to the wheel rim 51. A screw 51c advantageously passes through the shank 52a of each bucket 52.

According to a variant of the invention (not shown), the wheel rim 51 and the disks 55 and 56 may be provided to be formed in one piece. In other words, the half-rims 51a and 51b are in that case joined in one piece, obtained by moulding and/or machining.

The effect of improvement of the ventilation of the turbine described with reference to the embodiment of FIGS. 1 to 3 is also obtained with the device of the second embodiment.

Taking into account the relatively low level of stresses undergone by the buckets and the rim of a turbine wheel according to the invention, it may be envisaged to make these pieces and the disks of materials which, up to now, were not envisaged for this type of device. In particular, the use of composite resin, possibly reinforced with fibers, may be envisaged, certain pieces still being able to be made of metal.

As the buckets can be manufactured independently of the wheel rim and disks, they may be provided to be coated with an anti-abrasion or anti-erosion product before being assembled. In particular, the technical teaching of Applicants' Patent Application EP-A-0 543 753 may be applied.

A turbine wheel according to the invention is assembled from a wheel rim, one or two disks, and from buckets or buckets bearing reinforcements. These different components may be assembled by the means described and shown in the Figures or by any other appropriate means such as, in particular, cooperation of shapes, wedging, hooping, welding, soldering, adhesive bonding.

The invention has been represented with buckets removably mounted on the wheel rim and the disk. It is also possible to provide for these buckets to be mounted permanently on the wheel rim and/or the disk, in particular welded, soldered or bonded in position. Similarly, a one-piece wheel obtained by moulding may be produced, this wheel comprising a rim, one or two disks and buckets.

What is claimed is:

1. In a turbine wheel of the Pelton type, including a wheel rim and a plurality of buckets spaced about a periphery of the rim, the improvement comprising; at least one annular disk in the form of a continuous ring secured to the rim so as to extend radially outwardly with respect to the rim, said at least one annular disk having a plurality of spaced openings provided within an outer portion thereof spaced inwardly of an outer peripheral edge and radially outwardly of the rim for receiving the plurality of buckets, said at least one annular disk extending radially outwardly relative to said plurality of buckets such that said plurality of buckets are positioned within said spaced openings so that forces directed thereto are transmitted along a full length of each of said plurality of buckets to said at least one annular disk such that said at least one annular disk is adapted to absorb and transmit forces on said plurality of buckets to said rim, and said length being taken along a plane of said at least one annular disk; wherein said outer peripheral edge of said at least one annular disk forms a continuous annular portion of said at least one annular disk.

2. The turbine wheel according to claim 1, including two annular disks secured in spaced relationship with one another to the rim for supporting said plurality of buckets.

3. The turbine wheel according to claim 2, wherein each of said plurality of buckets includes two scoops, said two annular disks being substantially aligned on median axes (AA', BB') of said scoops.

4. The turbine wheel according to claim 3, wherein each of said two annular disks include spokes which are integrally, connected at their outer ends and which spokes extend between two adjacent of said plurality of buckets of the turbine wheel.

5. The turbine wheel according to claim 1, wherein said at least one annular disk is in a form of a perforated ring, and means for removably mounting said at least one annular disk on the rim being provided in a vicinity of an inner edge of said at least one annular disk.

6. The turbine wheel according to claim 1, wherein said at least one annular disk is formed in one piece with the rim.

7. The turbine wheel according to claim 6, wherein the wheel rim is formed by two parts as half-rims adapted to be assembled together.

8. The turbine wheel according to claim 1, wherein said plurality of buckets are removably mounted on said at least one annular disk.

9. The turbine wheel according to claim 1 wherein said plurality of buckets are permanently mounted on said at least one annular disk.

10. A Pelton-type turbine comprising a turbine wheel including a wheel rim, and a plurality of buckets spaced about the periphery of said rim at least one annular disk in the form of a continuous ring secured to the rim and having a plurality of spaced openings provided within an outer portion thereof spaced inwardly of an outer peripheral edge for receiving the plurality of buckets, said at least one annular disk extending radially outwardly relative to said plurality of buckets such that said plurality of buckets are positioned within said spaced openings so that forces directed thereto are transmitted along a full length of said plurality of buckets to said at least one annular disk and such that said at least one annular disk is adapted to absorb and transmit forces on said plurality of buckets to the rim, and said length being taken along a plane of said at least one annular disk; wherein said outer peripheral edge of said at least one annular disk forms a continuous annular portion of said at least one annular disk.

* * * * *